(12) United States Patent
Russell et al.

(10) Patent No.: US 10,870,534 B2
(45) Date of Patent: Dec. 22, 2020

(54) SUPPLEMENTAL LID FOR CORRUGATED CONTAINMENT SUMP

(71) Applicants: David D. Russell, Blodgett, MO (US); Robert Russell, Sikeston, MO (US)

(72) Inventors: David D. Russell, Blodgett, MO (US); Robert Russell, Sikeston, MO (US)

( * ) Notice: Subject to any disclaimer, the term of this patent is extended or adjusted under 35 U.S.C. 154(b) by 0 days.

(21) Appl. No.: 16/245,911

(22) Filed: Jan. 11, 2019

(65) Prior Publication Data
US 2020/0223627 A1    Jul. 16, 2020

(51) Int. Cl.
| E02D 29/14 | (2006.01) |
| B65D 90/10 | (2006.01) |
| F16L 55/134 | (2006.01) |

(52) U.S. Cl.
CPC ........... *B65D 90/105* (2013.01); *E02D 29/14* (2013.01); *E02D 29/149* (2013.01); *F16L 55/134* (2013.01)

(58) Field of Classification Search
CPC . E02D 29/1436; E02D 29/149; B65D 90/105; F16L 55/134
USPC ................................ 404/25; 52/19; 137/371
See application file for complete search history.

(56) References Cited

U.S. PATENT DOCUMENTS

| 4,512,492 | A | * | 4/1985 | Graybeal | ................ | E02D 29/14 220/203.28 |
| 4,685,585 | A | | 8/1987 | Robbins | | |
| 4,932,441 | A | * | 6/1990 | Corey | ................... | F16L 55/134 138/93 |
| 5,052,216 | A | | 10/1991 | Sharp | | |
| 5,052,851 | A | * | 10/1991 | Frishauf | ................ | E02D 29/124 404/25 |
| 5,425,466 | A | | 6/1995 | Bambacigno | | |
| 6,024,243 | A | | 2/2000 | Palazzo | | |
| 6,682,257 | B1 | * | 1/2004 | Zappe | ..................... | E02D 29/14 404/25 |
| 6,887,012 | B1 | | 5/2005 | Zappe | | |
| 7,153,057 | B1 | * | 12/2006 | Lucas | ..................... | E02D 29/14 404/25 |
| 8,353,308 | B2 | | 1/2013 | Parran et al. | | |
| 8,360,679 | B2 | | 1/2013 | Banks | | |
| 8,770,889 | B2 | | 7/2014 | Sharp | | |
| 8,936,045 | B2 | | 1/2015 | Lundman | | |
| 9,227,600 | B2 | | 1/2016 | Chen | | |
| 9,617,070 | B1 | | 4/2017 | Russell et al. | | |
| 9,936,814 | B2 | | 4/2018 | Alder et al. | | |

(Continued)

FOREIGN PATENT DOCUMENTS

WO    2017052707 A1    3/2017

OTHER PUBLICATIONS

Provisional Opinion and Provisional Search Report dated Apr. 27, 2020 in European Application Serial No. 20151532.7.

*Primary Examiner* — Gary S Hartmann
(74) *Attorney, Agent, or Firm* — Haugen Law Firm PLLP (57) ABSTRACT

An apparatus and method for providing a water impenetrable barrier between an underground duct and an access opening. The apparatus may cover a secondary opening in a corrugated containment sump of an underground storage tank or the manway of a sanitary sewer, catch basin or other manhole system. The apparatus includes a cover, inflatable seal and a tank of compressed nitrogen to inflate the seal. When sealed to the access opening, the cover restricts the inflow of water or other debris into the interior of the underground duct and nitrogen may be released into the sealed access.

17 Claims, 11 Drawing Sheets

(56) References Cited

U.S. PATENT DOCUMENTS

| | | |
|---|---|---|
| 2005/0221358 A1 | 10/2005 | Carrillo et al. |
| 2009/0260711 A1 | 10/2009 | Alder et al. |
| 2012/0273073 A1 | 11/2012 | Kutach et al. |
| 2013/0264341 A1 | 10/2013 | Cockerham et al. |
| 2016/0282217 A1 | 9/2016 | Lloyd et al. |

* cited by examiner

SUPPLEMENTAL LID FOR CORRUGATED CONTAINMENT SUMP

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to covers or caps to enclose manways or access points to underground systems. This invention more particularly pertains to an apparatus that seals off an opening with an inflatable seal, wherein the inflation mechanism is self-contained within the apparatus. The seal is inflated with compressed nitrogen and the compressed nitrogen may also be released into an enclosed access point of the underground system. By way of example, the cover may seal off and restrict water penetration into the interior of a containment sump from a secondary access point and nitrogen may be released into the interior of the containment sump to reduce corrosion of components within the containment sump.

BACKGROUND

Generally, containment sumps, underground storage tanks, sanitary sewers and other underground systems are buried below the frost line of the terrain surrounding the underground system. Access to these underground systems is oftentimes achieved through an opening or access point at ground level. These openings or access points may be large enough to provide physical access or entry into the system and a ground level cover may be utilized to enclose or block access to the opening.

Below the grade or ground level a secondary access point may be constructed and a lid or secondary cover may be utilized to further confine access into the underground system. At times, it is desirable to reduce or eliminate water or other debris from flowing or infiltrating into the underground system. Although a ground cover may restrict the flow of water or debris into the underground system, water and other liquids tend to find the paths of least resistance and may find their way around the ground cover and into the underground system. Further, many freeze/thaw cycles, erosion, or other influences may shift the ground cover or otherwise create a path for liquids to leak into the system. Also, the expansions and contractions of the system may further compromise the system.

An underground storage tank top sump is a generic term for a liquid-tight container installed on top of an underground storage tank designed to house various tank components. Tank top sumps serve a variety of functions including providing a juncture for piping systems, pumps, and other tank components. The sump may further serve to isolate the components from the corrosive effects of subsurface moisture and soil.

Prior devices have been described that attempt to create a secondary access point into the underground system, however the components within the underground system may still suffer from corrosion within the sealed system. No known prior device describes a cover for a secondary access point that includes an inflatable seal that redundantly seals against a corrugated sidewall and that may further release nitrogen into the sealed system to reduce corrosion within the sealed system.

SUMMARY

Embodiments according to aspects of the invention include an apparatus for restricting water penetration into the interior of an underground system. The apparatus of the invention includes a cover, an expandable pneumatic seal, and a tank containing compressed gas, which may by way of example include compressed nitrogen. Those skilled in the art will appreciate that the diameter and shape of the cover and expandable pneumatic seal may be modified to accommodate multiple sizes and shapes of underground systems without departing from the scope of the invention. The cover has a top and bottom surface, wherein an annular collar or concentric ring extends downwardly from the bottom surface of the cover to a free end of the collar or ring. A flange extends outwardly from at least one of or both of the cover and the concentric ring or collar. The flange rests upon the top end of the secondary access port. The annular expandable pneumatic seal engages with an outer surface of the collar or ring, wherein when the seal is expanded the seal expands outwardly, and expands upwardly towards the flange, and expands downwardly towards the free end of the concentric collar. The tank containing compressed gas or nitrogen is coupled in fluid communication with the pneumatic seal. A first valve is coupled inline between the tank of compressed gas and the pneumatic seal to control inflation of the pneumatic seal and delivery of gas to the pneumatic seal. A second valve is coupled to the pneumatic seal such that the second valve actuates to control deflation of the pneumatic seal and release of gas from the seal into space below the cover.

Alternatively, according to aspects of the invention, the apparatus may include a third valve coupled to the circular cover to form a fluid conduit between the bottom of the cover and the top of the cover. Fluid flows through the third valve from the space below the cover to space above the cover. By way of example, oxygen may be present immediately below the circular cover and forced through the third valve as nitrogen is released into the secondary access port below the cover.

A fourth valve may be coupled inline between the tank and pneumatic seal wherein the fourth valve may be of the solenoid actionable type between open and closed positions. A microprocessor is electrically coupled to the fourth valve wherein the microprocessor controls the solenoid and actuation of the fourth valve. A second tank containing compressed nitrogen may be pneumatically coupled to the fourth valve. The microprocessor may selectively open and close the fourth valve to thereby selectively control flow of gas from the first and second tanks. A fifth valve may be pneumatically coupled inline between the fourth valve and the second valve, and further coupled to the microprocessor, wherein the microprocessor further controls actuation of the fifth valve. The microprocessor may actuate the fourth and fifth valves to release nitrogen from the fifth valve into a space below the cover within the secondary access port.

A pressure gauge may be pneumatically coupled inline between the fourth valve and the fifth valve, and further coupled to the microprocessor, wherein the microprocessor may further control actuation of the fourth and fifth valves to control the pressure within the pneumatic seal. Further, the microprocessor may include a wireless communicator to couple wirelessly to an external controller. In this manner the microprocessor may be further utilized to remotely monitor and control inflation and deflation of the pneumatic seal. Additionally, a pressure sensor may be coupled to the microprocessor to provide data related to a pressure value corresponding to the space below the cover and within the secondary access port. In this manner the microprocessor may be utilized to release nitrogen into the sealed space below the cover to maintain a desired pressure within the sealed space.

In an embodiment of the invention the supplemental lid restricts water penetration through an upper portion of a secondary access port of an underground duct. The secondary access port may include a cylindrical sidewall forming a portion of the secondary access port, wherein the cylindrical sidewall may be smooth or have spaced apart ribs forming a portion of the cylindrical sidewall. One end of the cylindrical sidewall terminates at an open top end and a portion of the supplemental lid rests on the open top end. The supplemental lid includes a cover having a top and bottom surface. A collar or ring extends downwardly from the bottom surface of the annular cover to a free end of the collar. A flange extends outwardly from at least one of the cover and collar or ring. The collar is sized to fit within an interior space of the cylindrical sidewall and the flange is sized to engage with the open top end of the cylindrical sidewall. An annular expandable pneumatic seal is engaged to an outer surface of the collar, wherein when the seal is expanded the seal expands outwardly, and expands upwardly towards the flange, and expands downwardly towards the free end of the concentric collar such that the seal engages with the cylindrical sidewall and may contact the flange. A first tank containing compressed nitrogen is coupled in fluid communication with the pneumatic seal. A first valve is coupled inline between the first compressed nitrogen tank and the pneumatic seal to control inflation of the pneumatic seal and delivery of nitrogen to the pneumatic seal. A second valve is coupled to the pneumatic seal wherein the second valve actuates to control deflation of the pneumatic seal and release nitrogen from the seal into space below the circular cover.

Additionally, the supplemental lid may include a third valve coupled to the circular cover, wherein fluid flows through the cover valve from the space below the circular cover to space above the circular cover. Also, a fourth valve may be coupled in line between the first tank and the pneumatic seal wherein the fourth valve is solenoid actionable. A microprocessor is coupled to the fourth valve to control actuation of the fourth valve. Further, a second tank containing compressed nitrogen may be pneumatically coupled to the fourth valve. A fifth valve may be coupled inline between the fourth valve and the second valve, and further coupled to the microprocessor, wherein the microprocessor may further control actuation of the fourth and fifth valves to release nitrogen from the fifth valve into space below the circular cover. A pressure gauge may be pneumatically coupled inline between the fourth valve and the fifth valve, and further coupled to the microprocessor, wherein the microprocessor further controls actuation of the fourth and fifth valves to control the pressure within the pneumatic seal dependent upon pressure values obtained from the pressure gauge. A pressure sensor may be coupled to the microprocessor to provide data related to a pressure value corresponding to the space below the circular cover.

In an embodiment of the invention, water is restricted from penetrating through an upper portion of a secondary access port of an underground duct. The access port may include a cylindrical sidewall forming a portion of the secondary access port. The cylindrical sidewall may be corrugated or have spaced apart ribs forming a portion of the cylindrical sidewall. One end of the cylindrical sidewall terminates at an open top end. A supplemental lid of the invention includes a seal that, when inflated, provides a redundant seal between the lid and cylindrical sidewall. The supplemental lid includes a cover having a top and bottom surface. A collar extends downwardly from the bottom surface of the annular cover to a free end of the concentric collar. A flange extends outwardly from at least one of the cover and the collar. The collar is sized to fit within an interior space of the cylindrical sidewall and the flange is sized to engage with the open top end of the cylindrical sidewall. The pneumatic seal is expandable and is engaged to an outer surface of the collar. When the seal is expanded the seal expands outwardly, and expands upwardly towards the flange, and expands downwardly towards the free end of the concentric collar such that the seal engages with at least one rib of the cylindrical sidewall and also engages with a portion of the cylindrical sidewall between two spaced apart ribs. Additionally, the seal may be expanded sufficiently so that the seal also engages with the flange. In this manner a redundant sealing is formed between the sidewall and the supplemental lid.

In accordance with an aspect of the invention the lid is adapted to engage the pneumatic seal to a corrugated sidewall of a containment sump secondary access opening. The supplemental lid is dimensioned so that the pneumatic seal of the lid engages an inner surface of the corrugated sidewall when the secondary lid is positioned and resting on a top end of the corrugated sidewall of the access opening. The pneumatic seal is constructed from a relatively pliable material and when inflated the seal conforms to the corrugations, creating a redundant seal between the lid and sump. The tank containing compressed nitrogen may be utilized to provide a constant pressure within the pneumatic seal.

In use, and by way of example without limitation intended, a user may position the lid at a top end of a containment sump. The secondary lid includes a flange that rests on the top edge of the sump opening. A collar and pneumatic seal are sized to fit into the access opening. When inflated the seal conforms to the sidewall of the containment sump. When the lid is resting on the top end of the access port a user may activate an inflation valve to deliver compressed gas or nitrogen to the inflatable seal. The user may continue to inflate the seal until a desired pressure is achieved within the pneumatic seal (which may be indicated on an external pressure gauge). Alternatively, a microprocessor controller may be utilized to control actuation of a valve between an open and closed position to inflate the seal with nitrogen gas until a desired internal pressure is reached. When the seal deflates the nitrogen is released into the enclosed access port. An additional valve allows the user to intentionally release nitrogen into the sealed access port. In this manner the nitrogen may help reduce corrosion of components within the sump. Further, the lid may include a one way valve so that as nitrogen is released into the sealed system any oxygen present in the sealed sump will tend to exit out the one way valve.

When removing the lid the user activates a deflation valve to release the pressure within the inflatable seal. Once the seal is deflated the user may pull up on the lid and remove the lid from the containment sump secondary access opening. Those skilled in the art will appreciate that the sealable lid of the present invention may be adapted for use in other systems that may benefit from use of a lid having an inflatable redundant seal and delivery of nitrogen into the sealed containment area that is built into the lid.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be an undue limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The supplemental lid control system 10 of the present invention is particularly well suited for use in a secondary containment system. The supplemental lid control system may be utilized to restrict flow of liquid into an underground containment system. For purposes of describing the invention, and without limitation intended, the underground system will be described in the context of underground storage tanks and containment sumps coupled to the underground storage tank.

The supplemental lid control system 10 includes a supplemental lid 100 having structure and components described below in greater detail The supplemental lid 100 and sump 170 cooperate together to create a barrier that restricts water from penetrating into the interior of an underground system. The lid 100 includes an inflatable seal 30, at least one tank 14 having a compressed gas contained within the tank, at least an inflate control valve 70 and a deflate control valve 74, and a pneumatic conduit or line 34 that pneumatically interconnects the seal 30 and tank 70. The inflate control valve 70 and deflate control valve 74 are of a known suitable construction which may be hand operated or solenoid driven. A third valve 78 may be coupled to the lid 100 to allow oxygen to purge when the lid 100 is sealed to the sump 170.

The secondary or supplemental lid 100 restricts inflow of fluids into an interior of a containment sump 170 of an underground storage tank. The secondary lid 100 may be described further as having a cover 110 having a top surface 112 and a bottom surface 114. A ring 120, that is concentric with the cover 110, extends downwardly from the bottom surface 114 of the cover 110 to a free end 122 of the ring 120. A flange 130 extends outwardly from at least one of the cover 110 and the ring 120. The annular expandable pneumatic seal 30 engages to an outer surface 124 of the ring 120, wherein when the seal 30 is expanded the seal 30 expands outwardly, and expands upwardly towards the flange 130, and expands downwardly towards the free end 122 of the ring 120. The primary or first tank 14 containing compressed gas is coupled in fluid communication with the pneumatic seal 30. The first valve or inflation control valve 70 is coupled inline between the first tank 14 of compressed gas and the pneumatic seal 30, wherein the first valve 70 actuates between an open and closed position to control inflation of the pneumatic seal 30 and delivery of gas from the first tank 14 to the pneumatic seal 30. The second valve or deflation control valve 74 is coupled to the pneumatic seal 30 wherein the second valve 74 actuates between an open and closed position to control deflation of the pneumatic seal 30 and a release of gas from the seal 30 into space below the cover 110.

Figure 1:
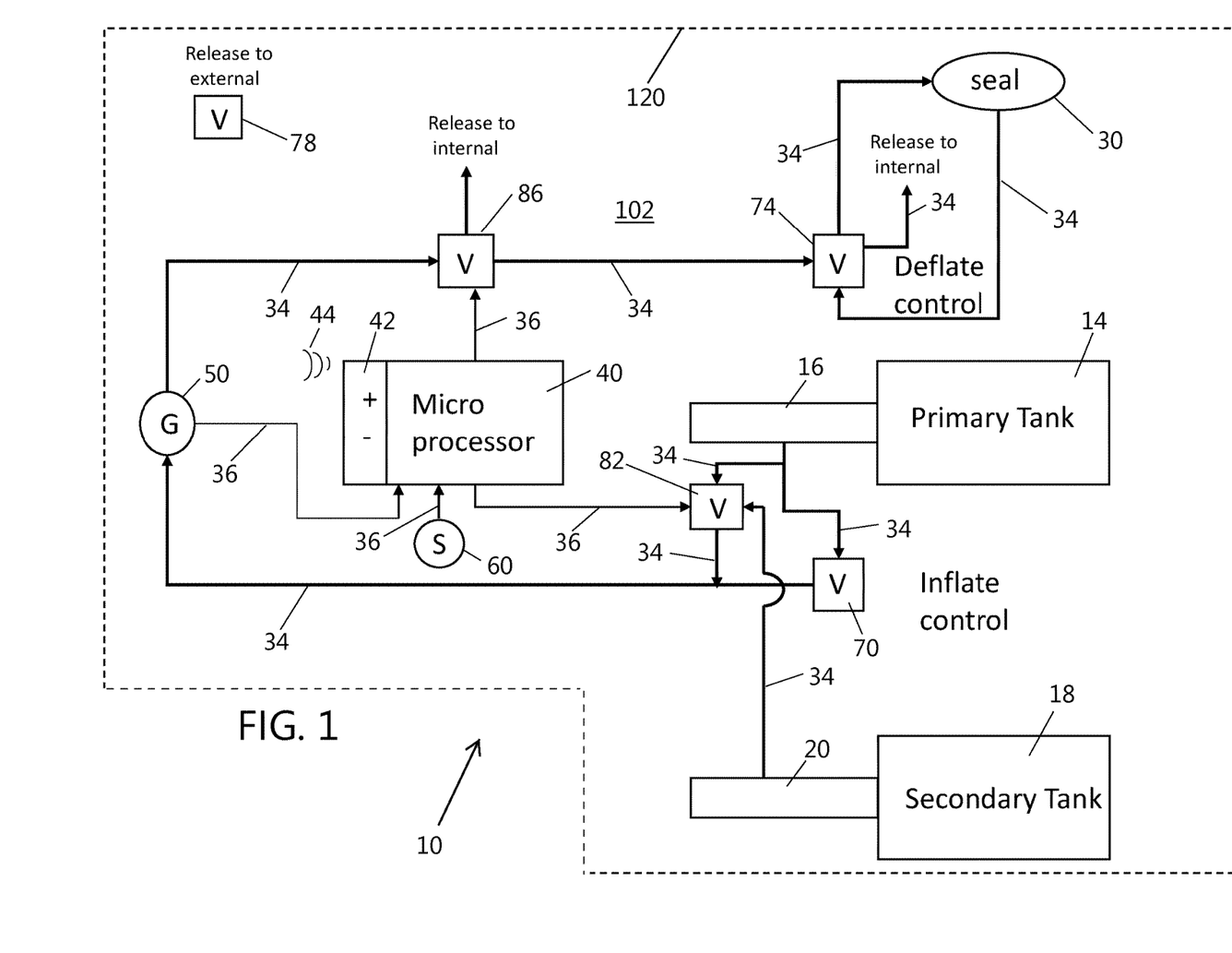
FIG. 1 is a partial schematic of the pneumatic and electrical interconnections of components of the supplemental lid in accordance with an embodiment of the invention.
Figure 2:
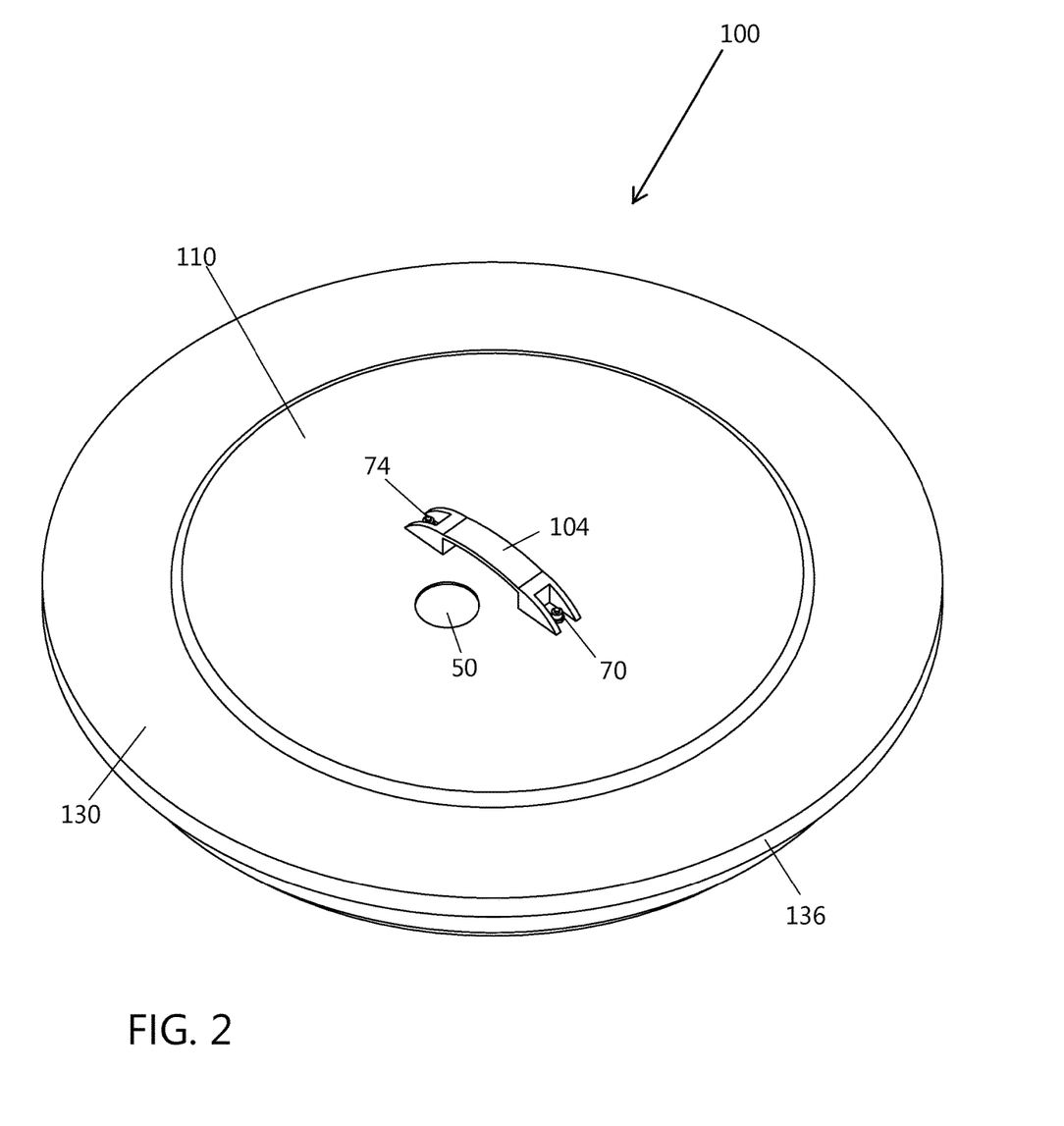
FIG. 2 is a top perspective view of the supplemental lid in accordance with an embodiment of the invention.
Figure 3:
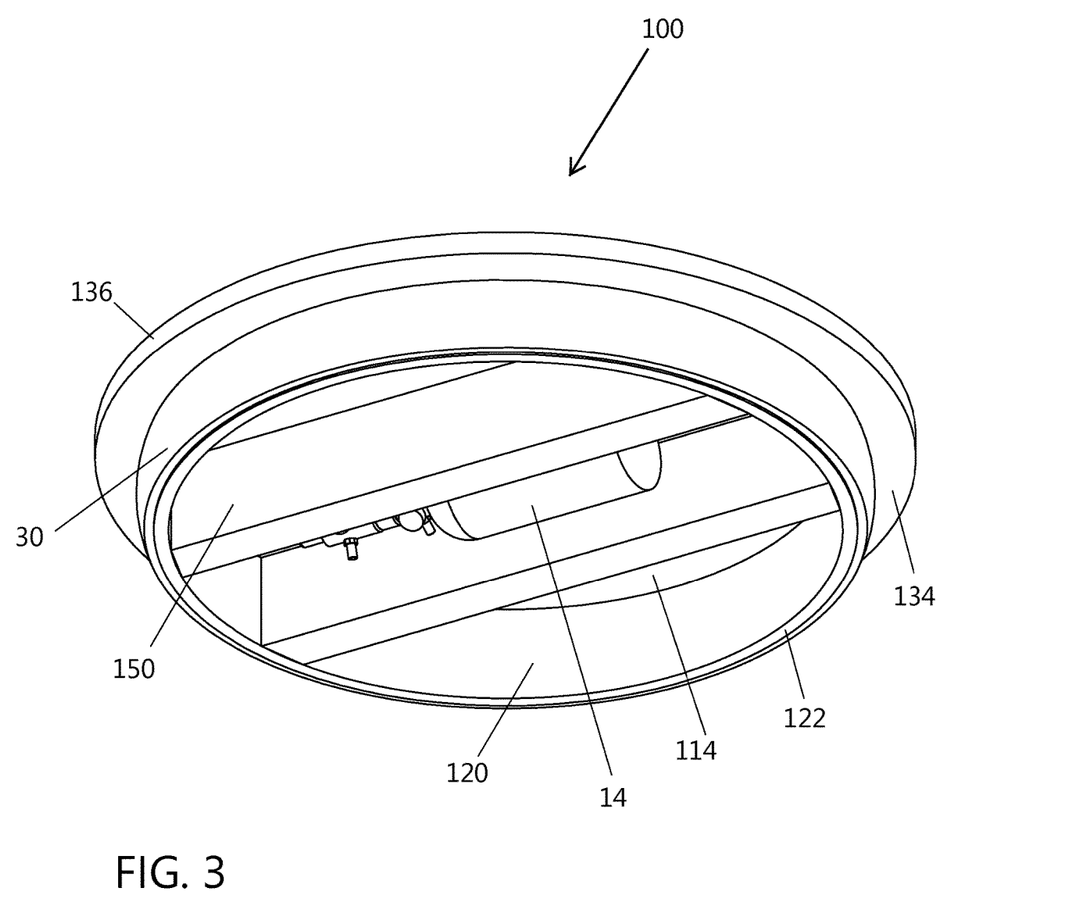
FIG. 3 is a bottom perspective view of the supplemental lid in accordance with an embodiment of the invention and having components of the lid removed for clarity.
Figure 4:
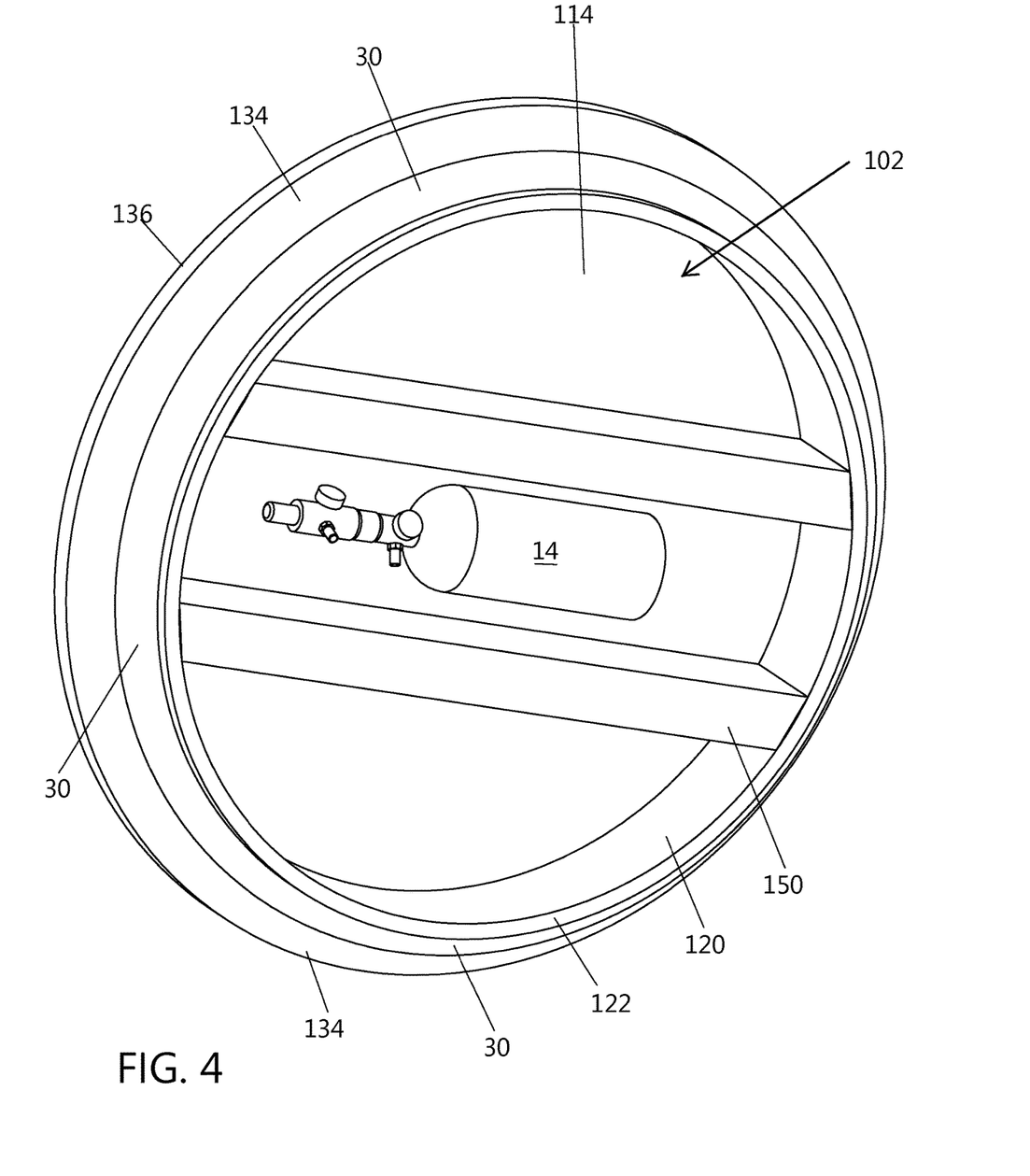
FIG. 4 is a bottom side elevational view of the supplemental lid in accordance with an embodiment of the invention having components of the lid removed for clarity.
Figure 5:
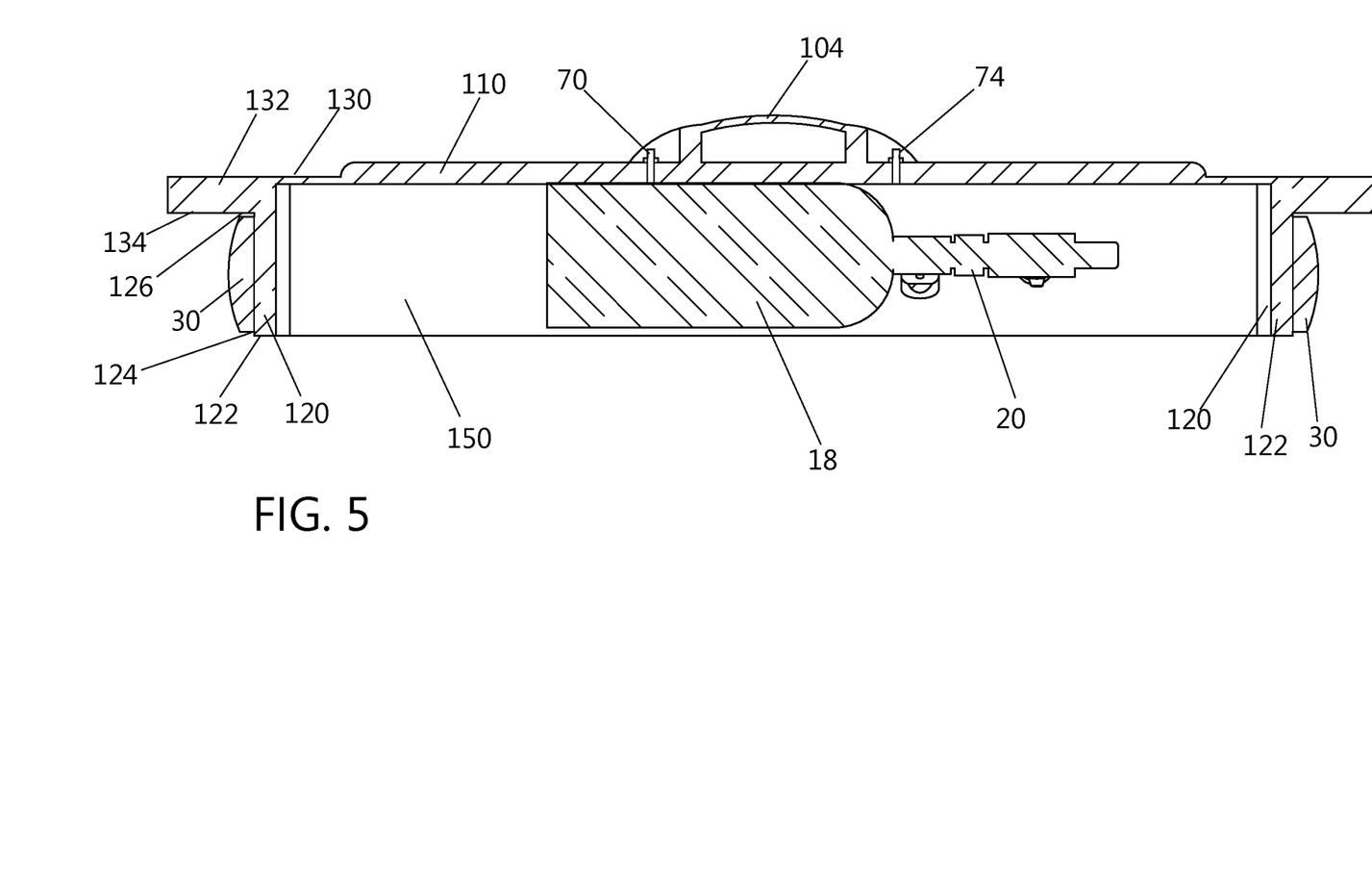
FIG. 5 is a partial sectional side elevational view of the supplemental lid in accordance with an embodiment of the invention.
Figure 6:
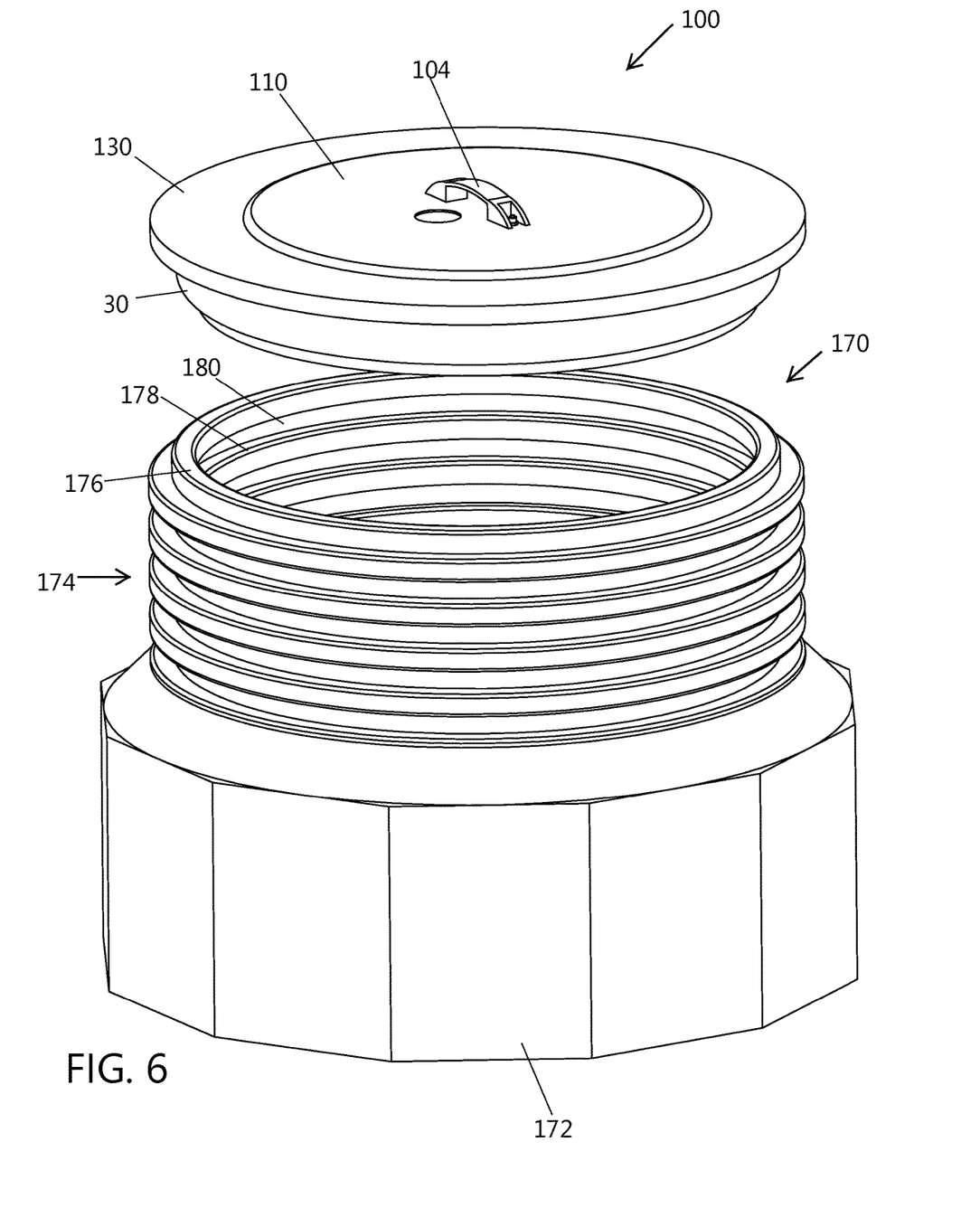
FIG. 6 is an upper perspective view of the supplemental lid in accordance with an embodiment of the invention and illustrating the lid elevated above the sump.
Figure 7:
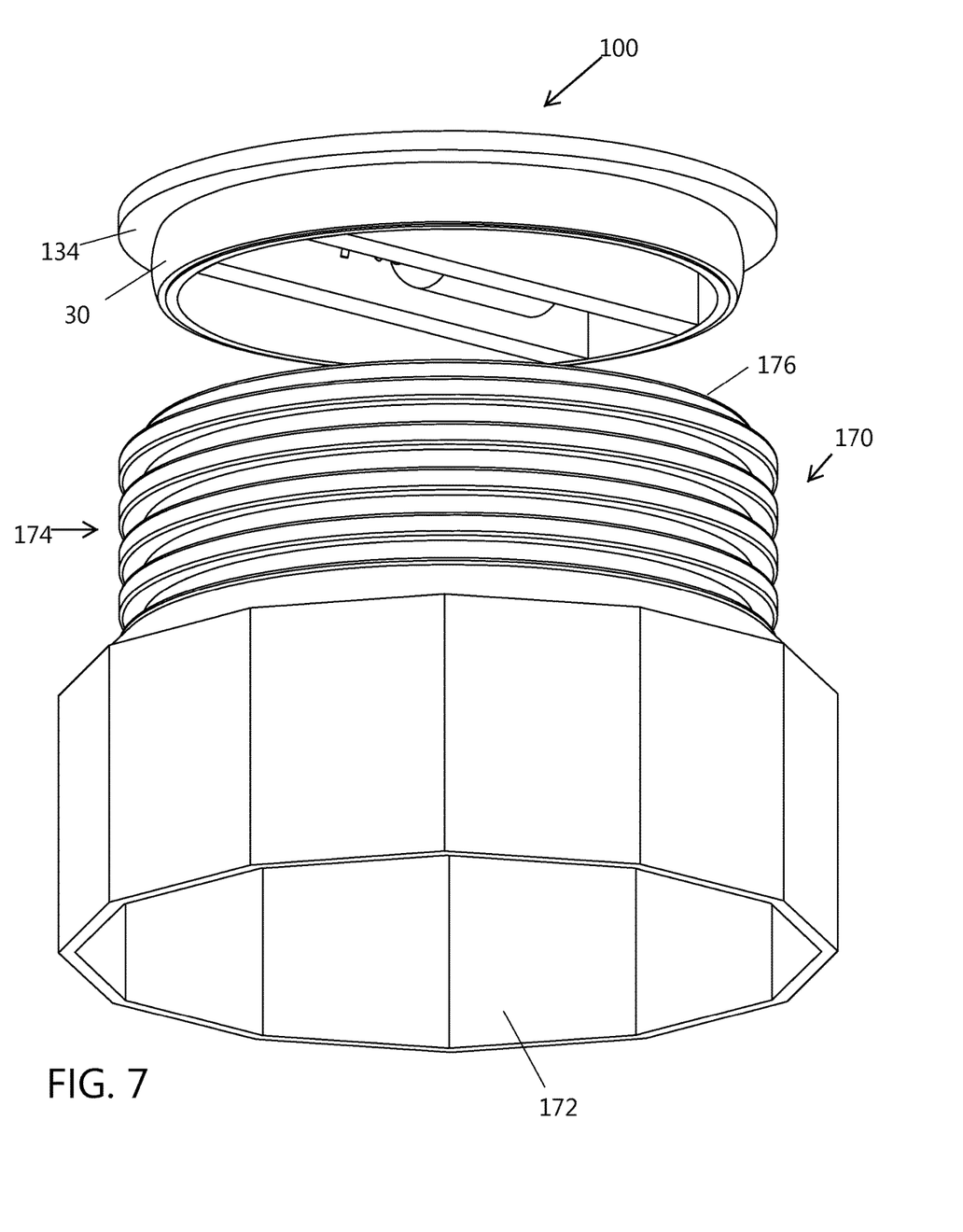
FIG. 7 is a lower perspective view of the supplemental lid in accordance with an embodiment of the invention and illustrating the lid elevated above the sump.
Figure 8:
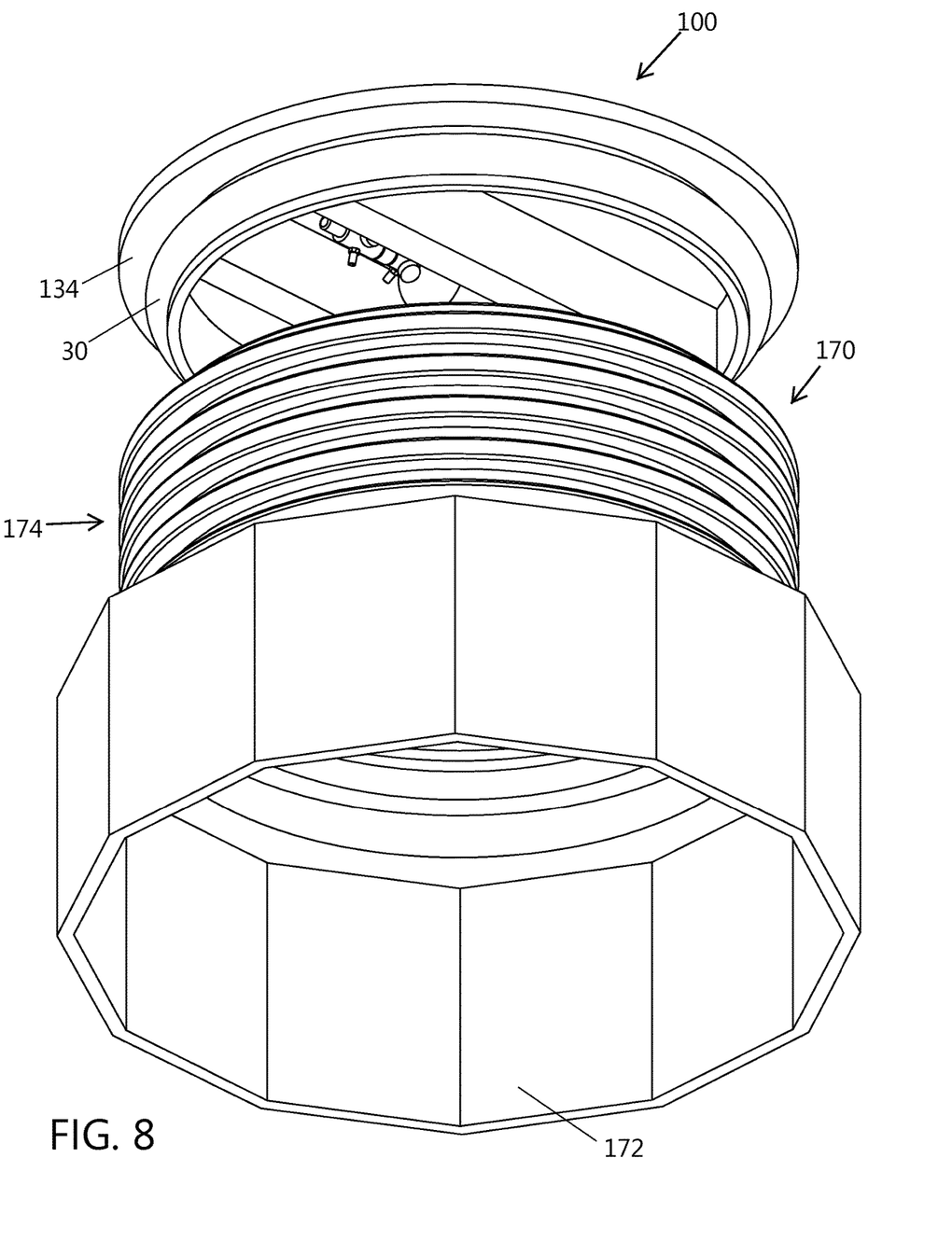
FIG. 8 is a lower perspective view of the supplemental lid in accordance with an embodiment of the invention and illustrating the lid elevated above the sump.
Figure 9:
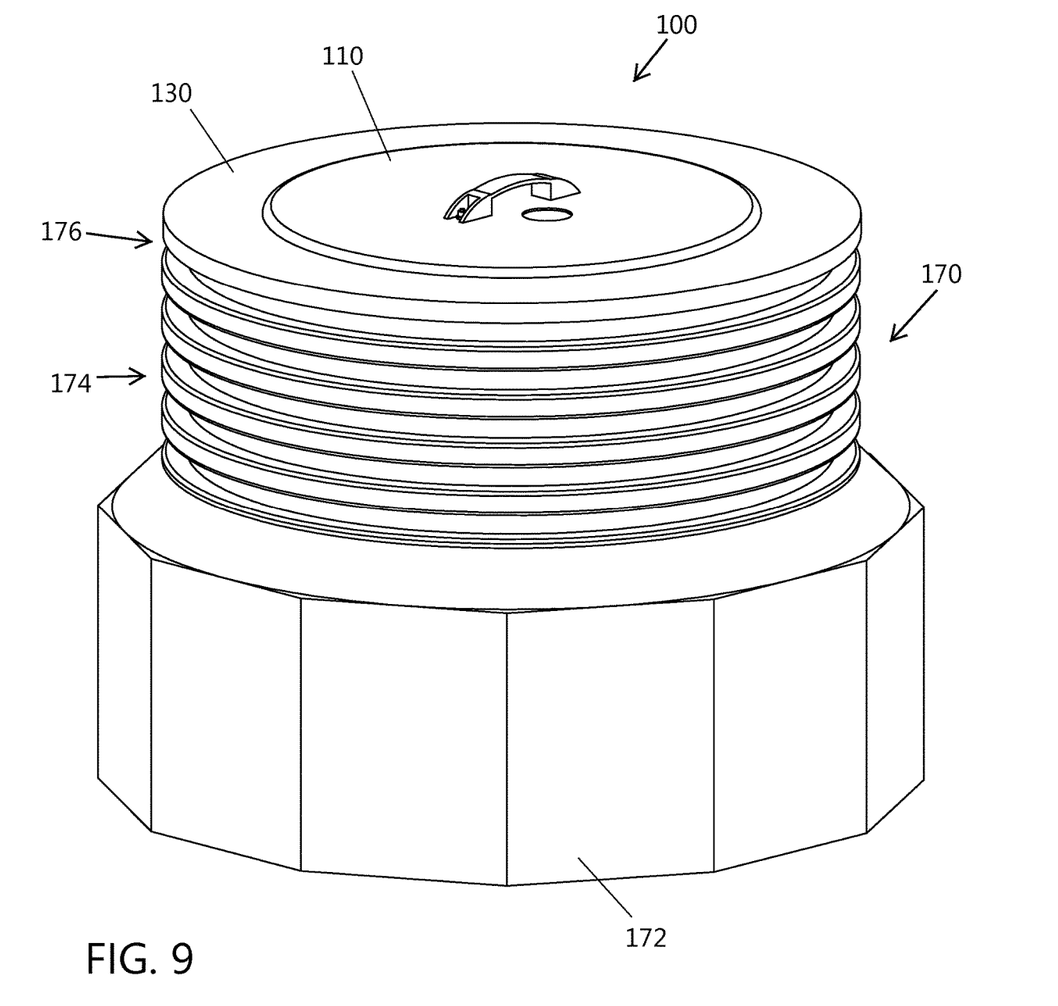
FIG. 9 is a perspective view of the supplemental lid in accordance with an embodiment of the invention and illustrating the lid in sealing engagement with the sump.
Figure 10:
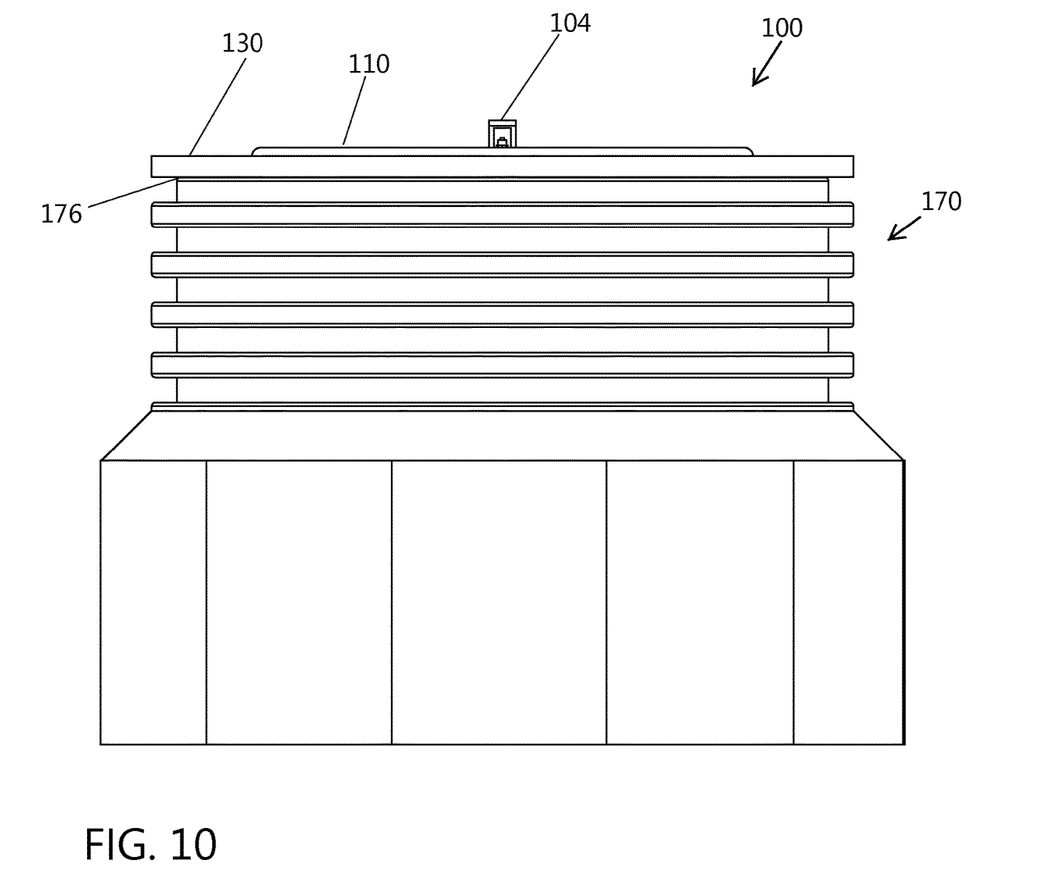
FIG. 10 is a side view of the supplemental lid in accordance with an embodiment of the invention and illustrating the lid in sealing engagement with the sump.
Figure 11:
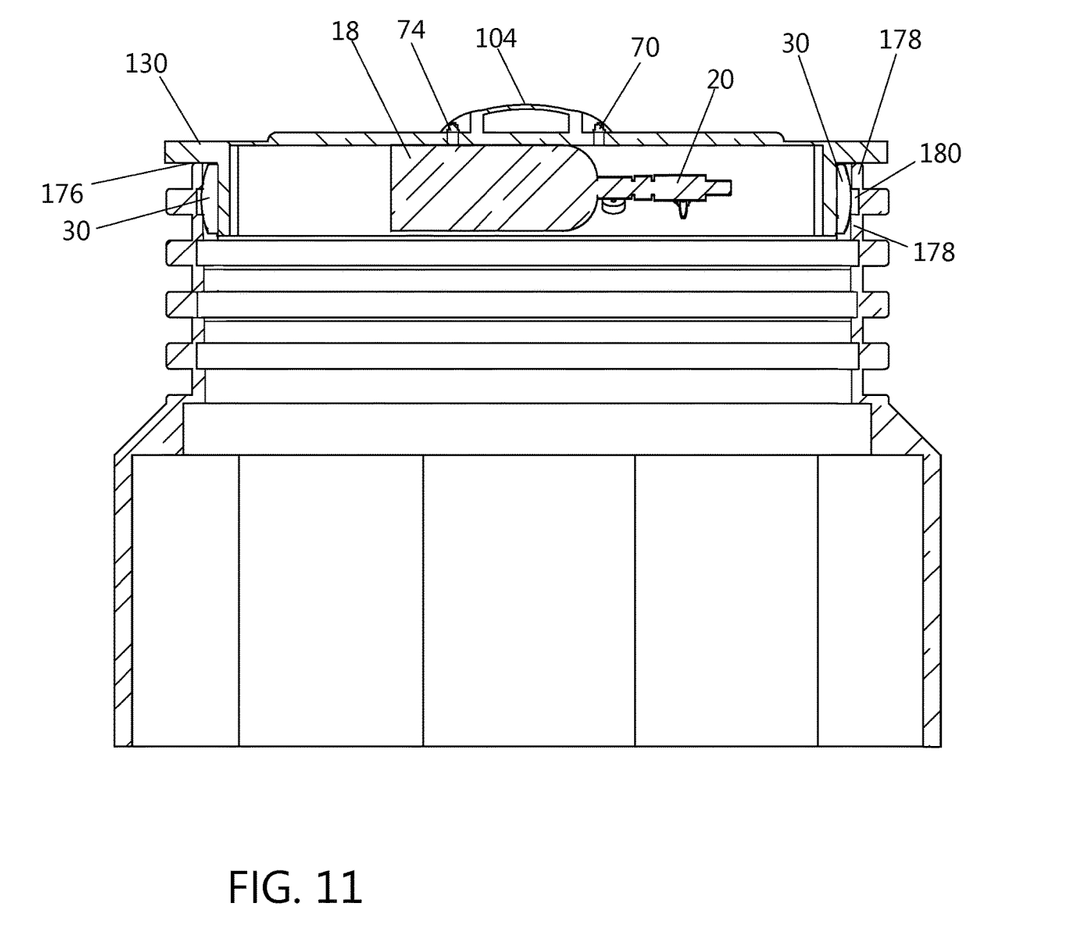
FIG. 11 is a partial sectional perspective view of the containment sump and supplemental lid in accordance with embodiments of the invention illustrating the lid sealed to the corrugated containment sump.

Turning attention now to the Figures, embodiments of the apparatus for restricting flow and infiltration into an underground system, and in particular the supplemental lid control system 10 of the present invention, will be described in greater detail. Referring first to FIG. 1, the primary tank 14 includes a regulator 16 to control the pressure of the gas delivered from the tank 14 to the inflate control valve 70. Valve 70 may be actuated between an open and closed positions to provide a supply of gas to valves 86 and 74. Gauge 50 is pneumatically coupled inline and fixed to the cover 110 in a manner to allow visual monitoring of the pressure of the gas being delivered to the seal 30. The primary tank 14 may be additionally pneumatically coupled to valve 82.

Secondary Tank 18 has a regulator 20 and is also pneumatically coupled to the valve 82.

Valve 82 has multiple open and closed positions and may be actuated between the various positions by a solenoid. The solenoid is electrically coupled to micro controller or processor 40. A signal is electrically sent over electrical circuit 36 from the microprocessor to the valve 82 to open and close the valve to allow flow of gas from either the primary tank 14 or secondary tank 18. The microcontroller 40 may be further electrically coupled to a solenoid actuated valve 86. When the valve is in the closed position gas flows through the valve to valve 74. When the microprocessor opens valve 86 gas flows from the valve into the internal space below the lid 100. In this manner the user may choose to deliver gas into the sealed sump area. The microprocessor 40 is further powered by power supply or battery 42 and includes the necessary electrical components to send and receive wireless signals 44. An external controller is wirelessly linked to the controller to allow control and actuation of the valves externally. The microprocessor 40 may further control actuation of valves 82 and 86 dependent upon the values received from sensor 60.

During operation, gas flows from either valve 70 or valve 82 through valve 86 to valve 74. Valve 74 is typically in the open position to allow flow of gas from the pneumatic conduit or line 34 to the seal 30. In this manner, a user may deliver pressurized air to the inflatable seal without removing the lid from the support frame 16. Without limitation intended, an internal pressure ranging between 3-15 psi has been found sufficient to engage the seal 30 to an inner sidewall 174 of sump 170 with enough force against the sidewall to reduce the likelihood that the lid is removed without first deflating the seal. Further, those skilled in the art will appreciate that the pressure within inflatable seal may be varied to compensate for changes in the environmental temperature surrounding the lid.

The gas pressure within the conduit 34 and seal 30 is monitored and maintained to keep the lid 100 sealed to the sump 170. When the lid is removed valves 70, 82 and 74 are in the closed position to restrict flow of gas to seal 30. Further, when valve 74 is closed the gas within seal 30 is released into the internal space 102 of the sump 170. Compressed nitrogen gas may be delivered to seal 30. When nitrogen is released into the sump 170 any oxygen present in the sump 170 tends to rise to the bottom surface 114 of the cover 110. One way release valve 78 is coupled to cover 110 to form a conduit between the bottom surface 114 of the cover and the top surface 112 of the cover 110. The release valve 78 actuates open to allow gases to flow through the valve from the space below the cover to space above the cover. One way release valve 78 allows oxygen to escape out of the sump without allowing air into the enclosed sump. In this manner, nitrogen gas may be intentionally released into the sump from valve 86 to reduce corrosion of components contained within the sump.

Referring now to FIGS. 2-5, the supplemental lid 100 includes a cover 110 having a top surface 112 and bottom surface 114. Handle 104 is attached to the top surface 112 of the cover 110. The handle 104 includes recesses that serve as guards for valve 70 and valve 74. A portion of each valve 70 and 74 extends through cover 110 and is coupled to the cover. The actuating mechanism for each valve extends from the cover 110 into the recesses of the handle 104. In this manner the valves are protected or guarded from unintentional bumps or activation. Ring 120 extends from the bottom surface 114 of the cover 110 to a free end 122 of the ring 120. Seal 30 engages to an outside surface 124 of the ring 120. The ring 120 is concentric with the cover 110. Flange 130 extends outwardly from the ring 120 or cover 110 at a connection point 126. The flange includes a top 132, bottom 134 and outer edge 136. The bottom 134 of the flange 130 rests on a top end 176 of sump 170. The bottom 114 of the cover 110 may include internal supports 150 that span between opposing sides of the ring 120. The internal supports may be utilized to couple and secure the various components of the supplemental lid control system 10 to the bottom of the cover 120 within the internal space 102 of the lid 100.

The diameter of the supplemental lid 100 and sump sidewall 174 are typically sized to allow passage there through by a user. Municipalities or cities often times will specify the minimum requirements for this opening. The lid 100 may be made of a suitable construction and, by way of example, may preferably be made from a combination of fiberglass and plastic. The inflatable seal 30 is preferably made of an expandable polymer or rubber. The seal 30 includes a hollow internal airway or central section to which air may delivered. As the air pressure within the internal airway increases the seal tends to expand and as the air pressure decreases the internal airway tends to relax and contract. The pneumatic seal 30 engages to a sidewall 174 of the sump 170, wherein when the seal is expanded the seal expands outwardly, and expands upwardly towards the flange 130, and expands downwardly towards the free end 122 of the ring or collar 120 such that the seal 30 engages with the cylindrical sidewall 174 when the flange 130 engages the top end 176 of the secondary access port or sump 170.

With reference now to FIGS. 6-11 the sump 170 and engagement of the lid 100 to the sump 170 will be further described. The sump 170 includes a base 172 that engages with the underground storage tank. The cylindrical sidewall 174 extends from the base 172 thereby forming a portion of the secondary access port. In an embodiment of the invention the cylindrical sidewall 174 is corrugated and has spaced apart ribs 178 forming a portion of the cylindrical sidewall 174. Valleys 180 interconnect the spaced apart ribs 178. When the pneumatic seal 30 is inflated the seal expands outwardly and engages with at least one rib 178 of the cylindrical sidewall and with a valley 180 or other portion of the cylindrical sidewall between two spaced apart ribs 178. The seal may have at least a two point contact with the sidewall 174 to create a redundant seal between the lid 100 and sump 170.

In use, the lid 100 rest on the top of sump 170. The inflatable seal 30 of the lid 100 engages the inner surface of the sidewall 174 of the sump 170. Once the lid 100 is resting on the top of the sump 170, the user may depress or activate the inflation valve control 70 to open the valve 70 and deliver nitrogen or gas from pressurized tank 70 into the inflatable seal 30. The user may continue to depress the inflation valve 70 until the desired air pressure within the pneumatic seal 30 is indicated on the external pressure gauge 50. When removing the lid 100, the user depresses or activates the discharge or deflation control valve 74 to release the nitrogen from the conduit 34 and seal 30. Once the seal 30 is deflated the user may pull up on the handle 104 and remove the lid 100 from the containment sump 170 or secondary access opening. Microprocessor 40 couples wirelessly to an external control to allow autonomous control of the inflating and deflating of the seal 30 or release of nitrogen gas into the sealed sump 170.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A secondary lid that restricts inflow of fluids into an interior of a containment sump of an underground storage tank having a secondary access opening, the secondary lid comprising:
   a cover having a top and bottom surface;
   a ring that is concentric with the cover, wherein the ring extends downwardly from the bottom surface of the cover to a free end of the ring;
   a flange extending outwardly from at least one of the cover and the ring;
   an annular expandable pneumatic seal engaged to an outer surface of the ring, wherein when the seal is expanded the seal expands outwardly, and expands upwardly towards the flange, and expands downwardly towards the free end of the ring;
   a first tank containing a compressed gas and the first tank coupled in fluid communication with the pneumatic seal;
   a first valve coupled inline between the first tank of compressed gas and the pneumatic seal, wherein the first valve actuates between an open and closed position to control inflation of the pneumatic seal and delivery of gas from the first tank to the pneumatic seal; and
   a second valve coupled inline and in series between the first tank and the pneumatic seal wherein the second valve actuates between an open and closed position to control deflation of the pneumatic seal and a release of gas from the seal into space below the cover.

2. The secondary lid as recited in claim 1 further including a third valve coupled to the cover to form a conduit between the bottom surface of the cover and the top surface of the cover, wherein the third valve actuates to allow gases to flow through the third valve from the space below the cover to space above the cover.

3. The secondary lid as recited in claim 2, further including a fourth valve coupled inline between the first tank and pneumatic seal wherein the fourth valve is solenoid actionable between open and closed positions, and further including a microprocessor coupled to the fourth valve wherein the microprocessor controls actuation of the fourth valve.

4. The secondary lid as recited in claim 3 further including a second tank containing compressed nitrogen pneumatically coupled to the fourth valve.

5. The secondary lid as recited in claim 4, wherein the microprocessor selectively opens and closes the fourth valve to control flow of gas from the first and second tanks.

6. The secondary lid as recited in claim 5, further including a fifth valve coupled inline between the fourth valve and the second valve below the cover, and further coupled to the microprocessor, wherein the microprocessor further controls actuation of the fourth and fifth valves to release nitrogen gas from the fifth valve into space below the cover.

7. The secondary lid as recited in claim 6, further including a pressure gauge pneumatically coupled inline between the fourth valve and the fifth valve, and further coupled to the microprocessor, wherein the microprocessor further controls actuation of the fourth and fifth valves to control the pressure within the pneumatic seal.

8. The secondary lid as recited in claim 3, wherein the microprocessor includes a wireless communicator to couple wirelessly to an external controller.

9. The secondary lid as recited in claim 3, further including a pressure sensor coupled to the microprocessor to provide data related to a pressure value corresponding to the space below the cover.

10. A device for restricting water penetration through an upper portion of a secondary access port of an underground duct, said device comprising:
    a cylindrical sidewall forming a portion of the secondary access port, wherein one end of the cylindrical sidewall terminates at an open top end of the secondary access port;
    a cover having a top and bottom surface;
    a collar that is concentric with the cover, wherein the collar extends downwardly from the bottom surface of the cover to a free end of the collar;
    a flange extending outwardly from at least one of the cover and collar, wherein the collar is sized to fit within an interior space of the cylindrical sidewall of the access port and the flange is sized to engage with the open top end of the secondary access port;
    an annular expandable pneumatic seal engaged to an outer surface of the collar, wherein when the seal is expanded the seal expands outwardly, and expands upwardly towards the flange, and expands downwardly towards the free end of the collar such that the seal engages with the cylindrical sidewall when the flange engages the top end of the secondary access port;
    a first tank containing compressed nitrogen and coupled in fluid communication with the pneumatic seal;
    a first valve coupled inline between the first tank of compressed nitrogen and the pneumatic seal, wherein the first valve actuates between an open and closed position to control inflation of the pneumatic seal and delivery of nitrogen from the first tank to the pneumatic seal;
    a second valve coupled to the pneumatic seal wherein the second valve actuates between an open and closed position to control deflation of the pneumatic seal and a release of nitrogen from the seal into space below the cover; and
a third valve not coupled inline but coupled to the cover to form a conduit between the bottom surface of the cover and the top surface of the cover, wherein the third valve actuates to allow gases to flow through the third valve from the space below the cover to space above the cover.

11. The secondary lid as recited in claim 10, further including a fourth valve coupled inline between the first tank and pneumatic seal wherein the fourth valve is solenoid actionable between open and closed positions, and further including a microprocessor coupled to the fourth valve wherein the microprocessor controls actuation of the fourth valve.

12. The secondary lid as recited in claim 11 further including a second tank containing compressed nitrogen pneumatically coupled to the fourth valve.

13. The secondary lid as recited in claim 12, wherein the microprocessor selectively opens and closes the fourth valve to control flow of gas from the first and second tanks.

14. The secondary lid as recited in claim 13, further including a fifth valve coupled inline between the fourth valve and the second valve below the cover, and further coupled to the microprocessor, wherein the microprocessor further controls actuation of the fourth and fifth valves to release nitrogen gas from the fifth valve into space below the cover.

15. The secondary lid as recited in claim 14, further including a pressure gauge pneumatically coupled inline between the fourth valve and the fifth valve, and further coupled to the microprocessor, wherein the microprocessor further controls actuation of the fourth and fifth valves to control the pressure within the pneumatic seal.

16. The secondary lid as recited in claim 12, wherein the microprocessor includes a wireless communicator to couple wirelessly to an external controller.

17. The secondary lid as recited in claim 12, further including a pressure sensor coupled to the microprocessor to provide data related to a pressure value corresponding to the space below the cover.

* * * * *